Feb. 24, 1931. A. J. DENNISS ET AL 1,794,280
DEVICE FOR PROTECTING PHOTOGRAPHIC ROLL FILMS FROM EDGE FOG
Filed April 6, 1929
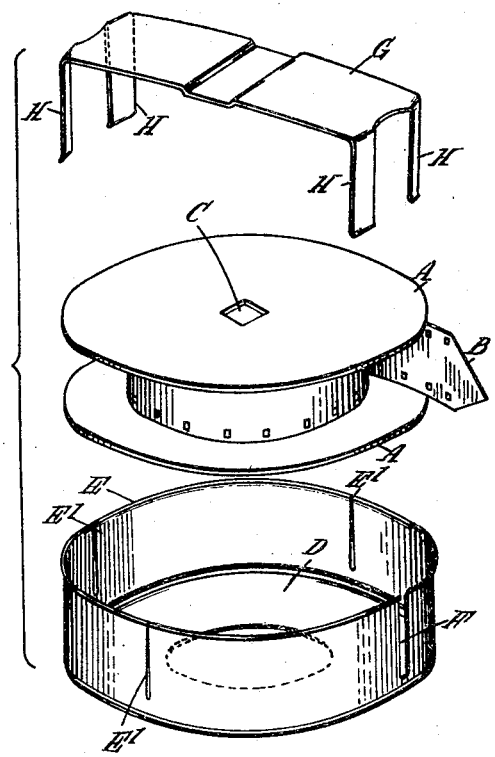
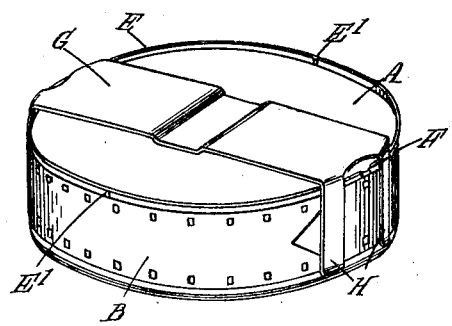
Inventors
Alfred J. Denniss
and Valentine W. Edwards
by Wilkinson & Giusta
Attorneys Patented Feb. 24, 1931

1,794,280

UNITED STATES PATENT OFFICE

ALFRED JOSEPH DENNISS, OF CHINGFORD, AND VALENTINE WILLIAM EDWARDS, OF LONDON, ENGLAND, ASSIGNORS TO THE HOUGHTON-BUTCHER MANUFACTURING COMPANY, LIMITED, OF LONDON, ENGLAND, AN ENGLISH LIMITED-LIABILITY COMPANY

DEVICE FOR PROTECTING PHOTOGRAPHIC ROLL FILMS FROM EDGE FOG

Application filed April 6, 1929, Serial No. 353,143, and in Great Britain April 10, 1928.

This invention relates to improvements in protective covers or cartridges employed for the purpose of excluding light from photograhpic roll films and more particularly cinematograph films prior to loading them into the camera and for their transportation subsequent to their exposure and removal from the camera. These cinematograph films, more especially the smaller sizes for amateur use, are wound on deep-flanged reels, and it has been proposed to provide two separable flanger caps having plain heads and adapted to fit tightly one within the other and enclose the reel prior to inserting it in the camera and after its removal therefrom. In loading the camera it was proposed to leave the inner cap on the reel until the latter was in position in the camera and then to remove said cap and at once close the camera.

According to the present invention means are provided for protecting from light a photographic roll film wound on a flanged reel, said means comprising a single detachable cap or cover having a head of approximately the same diameter as the film reel, and a springy or yielding flange adapted to fit tightly over the edges of the reel flanges. The close contact between the cover flange and the edges of the reel flanges thus provides adequate protection from light during the transportation or handling of the reel and is cheaper and simpler than two caps fitting one within the other.

The flange of our single cover may be made springy or yieldable in any convenient manner for instance by slitting the same transversely at one or more points and springing the free edge of the flange inwards. Further, according to the present invention, if it is desired to leave the cover in position on the reel after the latter has been placed in the camera and until the usual leading strip of the film has been threaded through the camera mechanism and attached to the take-up reel, a slot may be provided in the cover flange through which sufficient of the leading strip projects for the purpose aforesaid. This projecting portion of the leading strip may be wound round the outside of the cover flange and secured in position by any convenient means, for instance by a metal clip, a strip of gummed paper, or an elastic band or the like.

The head of the cover may be either grooved, corrugated or plain as desired and is provided with a central hole through which, after the reel is in position in the camera, a finger may be inserted so as to press against the reel to enable the cover to be removed.

One form of construction in accordance with this invention is illustrated in the accompanying drawing, in which:—

Fig. 1 is a perspective view of a film reel with the film wound thereon, a cap or cover in accordance with the invention, and a securing clip.

Fig. 2 is a perspective view showing the cover in position on the reel and the clip securing the leading strip of the film, in the form in which the reel of film would be handled before insertion in the camera.

Referring to the drawings:—

A A are the flanges of a cinematograph film reel with the film wound thereon and provided with a perforated leading strip B adapted to be threaded through the camera mechanism and attached to the take-up reel. A square hole C is provided for locating the reel on the camera spindle.

For the purpose of protecting the film from light tending to produce what is known as "edge fog" during the handling of the reel either before or after the film has been exposed in the camera a single detachable cap or cover is provided comprising a head D of approximately the same diameter as the reel flanges A, and a flange E slit at several points $E^1$ with the edges of the flange sprung inwards to enable it to yield sufficiently to pass over the flanges A and then grip the edges thereof.

A slot F is also provided in the flange E to enable the leading strip B to be passed therethrough and wound round the outside of the flange as shown in Fig. 2. A metal clip G having spring prongs or fingers H is then slipped on over the leading strip B and holds the same securely in position. It will be observed that the leading strip covers the slot F and slits E¹ and prevents the admission of light therethrough.

In use, the cover is left on the reel until the latter is in position in the camera, and the leading strip threaded through to the take-up reel. The cover is then slid off axially and the camera immediately closed. When the film has been exposed and fully wound on the take-up reel, the cover is placed in position on this reel before it is withdrawn from the camera.

If necessary, the final portion of the film "run-off" strip may be left unperforated in order to prevent its being wound on to the take-up reel, it being understood that the absence of perforations will automatically stop the passage of the "run-off" strip through the camera sprocket; the un-wound portion of the strip may then, after being disengaged from the gate and sprocket, be wound round the periphery of the cover-flange and secured in a similar manner to the leading strip hereinbefore described.

The present invention thus provides a simple and effective light-excluding device which enables a reel of film to be handled freely in full daylight both before and after exposure in the camera without danger of edge-fogging due to the penetration of light between the edges of the film roll and the flanges of the reel.

What we claim is:—

1. Means for protecting photographic roll film wound on a flanged reel from the action of light during transportation or handling comprising a single detachable cover having a head of approximately the same diameter as the reel, a flange of sufficient depth to enclose the space between the reel flanges, and transverse slits in said flange to impart springiness thereto so that said flange may be slightly expanded to pass over the edges of the reel flanges and due to its springiness exert a grip thereon.

2. Means for protecting photographic roll film wound on a flanged reel from the action of light during transportation or handling comprising a single detachable cover having a head of approximately the same diameter as the reel, a flange of sufficient depth to enclose the space between the reel flanges, transverse slits in said flange to impart springiness thereto, and a slot in said flange such as to enable the "leading strip" or the "run-off strip" of the roll film to be passed therethrough.

3. Means for protecting photographic roll film wound on a flanged reel from the action of light during transportation or handling comprising a single detachable cover having a head of approximately the same diameter as the reel, a flange of sufficient depth to enclose the space between the reel flanges, slits in said flange to impart springiness thereto, a slot in said flange such as to enable the "leading strip" or the "run-off strip" of the roll film to be passed therethrough, and a clip adapted to fit over the flange of the cover so as to retain in position the "leading strip" or the "run-off strip" wound externally round the cover flange.

ALFRED JOSEPH DENNISS.
VALENTINE WILLIAM EDWARDS.